(12) United States Patent
Bravo Orellana

(10) Patent No.: US 10,907,960 B1
(45) Date of Patent: Feb. 2, 2021

(54) CALIBRATION SYSTEM FOR COMBINED DEPTH AND TEXTURE SENSOR

(71) Applicant: Outsight SA, Paris (FR)

(72) Inventor: Raul Bravo Orellana, Paris (FR)

(73) Assignee: Outsight SA, Paris (FR)

( * ) Notice: Subject to any disclaimer, the term of this patent is extended or adjusted under 35 U.S.C. 154(b) by 0 days.

(21) Appl. No.: 16/735,557

(22) Filed: Jan. 6, 2020

(51) Int. Cl.
 *G01B 11/25* (2006.01)
 *H04N 13/246* (2018.01)
 *H04N 13/257* (2018.01)

(52) U.S. Cl.
 CPC ...... *G01B 11/2504* (2013.01); *G01B 11/2509* (2013.01); *H04N 13/246* (2018.05); *H04N 13/257* (2018.05)

(58) Field of Classification Search
 CPC .................. G01B 11/2504; G01B 11/2509
 USPC .................................................. 356/72–73.1
 See application file for complete search history.

(56) References Cited

U.S. PATENT DOCUMENTS

| | | | |
|---|---|---|---|
| 8,879,828 B2 | 11/2014 | Bell et al. | |
| 8,989,944 B1* | 3/2015 | Agarwal | G01S 13/589 701/23 |
| 9,639,748 B2 | 5/2017 | Porikli et al. | |
| 10,222,474 B1* | 3/2019 | Raring | G01S 7/4817 |
| 2011/0020949 A1* | 1/2011 | Sugiyama | G01N 35/1002 436/174 |
| 2019/0355173 A1* | 11/2019 | Gao | G01C 21/32 |
| 2020/0026925 A1* | 1/2020 | Yu | G06K 9/3233 |
| 2020/0116867 A1* | 4/2020 | Zhu | G05D 1/0088 |
| 2020/0284883 A1* | 9/2020 | Ferreira | G01S 7/4816 |

FOREIGN PATENT DOCUMENTS

WO 2019154536 A1 8/2019

OTHER PUBLICATIONS

Chai et al., "Novel Method for LiDAR Camera Calibration by Plane Fitting", Proceedings of the 2018 IEEE/ASME International Conference on Advanced Intelligent Mechatronics (AIM), Auckland, New Zealand, Jul. 9-12, 2018, 7 pages.
Gao et al., "On-line Calibration of Multiple LIDARs on a Mobile Vehicle Platform", Proceedings—IEEE International Conference on Robotics and Automation, DOI: 10.1109/ROBOT.2010.5509880, Jun. 2010, 6 pages.
Park et al., "Calibration between Color Camera and 3D LIDAR Instruments with a Polygonal Planar Board", Sensors 2014, 14, 5333-5353; doi:10.3390/s140305333, 21 pages.

(Continued)

*Primary Examiner* — Sunghee Y Gray
(74) *Attorney, Agent, or Firm* — Daylight Law, P.C.

(57) ABSTRACT

We disclose sensor systems, and associated calibration systems and methods, that provide efficient and reliable depth and texture fusion. One disclosed method includes transmitting a first light beam from a first perspective, transmitting a second light beam from a second perspective, aligning a visible light photodetector with the second perspective, aligning a depth sensor with the first perspective, and mutually registering the visible light photodetector and the depth sensor using a return of the first light beam, a return of the second light beam, and a reference map. The reference map can include a transform from a reference frame based on the first perspective and a reference frame based on the second perspective.

23 Claims, 5 Drawing Sheets

(56) References Cited

OTHER PUBLICATIONS

Scaramuzza et al., Extrinsic Self Calibration of a Camera and a 3D Laser Range Finderfrom Natural Scenes, Proceedings of the 2007 IEEE/RSJ International Conference on Intelligent Robots and Systems San Diego, CA, USA, Oct. 29-Nov. 2, 2007, 6 pages.

Unnikrishnan et al., "Fast Extrinsic Calibration of a Laser Rangefinder to a Camera", Robotics Institute, Carnegie Mellon University, Pittsburgh, Pennsylvania, Jul. 2005, 20 pages.

Zhang et al., "Extrinsic Calibration of a Camera and Laser Range Finder (improves camera calibration)", 2010 IEEE International Conference on Robotics and Automation, DOI: 10.1109/ROBOT.2010.5509880, 6 pages.

\* cited by examiner

CALIBRATION SYSTEM FOR COMBINED DEPTH AND TEXTURE SENSOR

BACKGROUND

Colorized three-dimensional imaging systems can be formed by adding depth information to a two-dimensional color image. The format of the resulting images can be referred to as 2.5 D with each pixel in the image including both the original color values (such as in the form of an RGB encoding) and a depth value. The depth value can be a distance from the perspective of the imager to the location of the pixel. Alternatively, the format of the resulting image can be a full three-dimensional point cloud where color values have been assigned to each of the points. Colorized three-dimensional images can also be formed by adding color information to a three-dimensional image. In either approach, when the depth and color information are obtained by separate sensors, the process associated with combining the data is referred to as sensor fusion.

The two-dimensional color images for a sensor fusion processes can be acquired by a visible light sensor. For example, the color information can be obtained by a standard color video camera. The collection of values that encode the two-dimensional image can be referred to as the texture of the image. As used herein, the term "texture" refers to the spatial arrangement and values of color, intensity, and/or other variables that encode the perceived visual appearance of pixels in an image.

The depth information for a sensor fusion processes can be acquired using various forms of depth sensors. For example, the depth information can be obtained using a time-of-flight (ToF) measurement using a light detection and ranging (LIDAR) imaging system or a change-in-frequency (CiF) measurement using a frequency-modulated continuous wave (FMCW) LIDAR imaging system. The collection of values that encode the depth information can be sets of three-dimensional cartesian coordinates provided with respect to a fixed three-axis reference frame or sets of angle and magnitude vectors provided with respect to a given point such as an aperture of the depth sensor.

SUMMARY

Sensor systems, and associated calibration systems and methods, that provide efficient and reliable depth and texture fusion are disclosed herein. The depth information can be three-dimensional information regarding a set of points as collected by a LIDAR. The texture information can be color information regarding a set of pixels as collected by a visible light photodetector. The visible light photodetector can be part of a standard two-dimensional visible light camera. Using specific embodiments of the approaches disclosed herein, a stream of three-dimensional LIDAR data can be colorized in real time using information from a visible light camera, or a stream of video from a visible light camera can be augmented with depth information in real time using data from a LIDAR. Although the example of a combined sensing system using a LIDAR and a visible light photodetector is used throughout this disclosure, the approaches disclosed herein are more broadly applicable to any combination of depth and texture sensors.

Generally, sensor fusion works effectively when both sensors are positioned to capture an environment from the same or nearly the same perspective (e.g., a depth sensor mounted on top of a camera to minimize parallax errors). However, this positioning of depth sensors and texture sensors may be impractical in certain applications. For example, space may be limited such that augmenting a collection of texture sensors with individual depth sensors may not be an option. Furthermore, cost constraints and the objectives of the system may push against the provisioning of a depth sensor to every texture sensor in a system when depth information is only required for a subset of the area covered by the texture sensors. When the two sensors must be positioned far apart from each other, calibration is required to align the two sensors prior to conducting sensor fusion. This process of calibration can include mutually registering the two sensors such that a point in a capture from the first sensor can be identified in a capture from the second sensor, and a point in a capture from the second sensor can be identified in a capture from the first sensor. This mutual registration can then assist in sensor fusion in that data captured from both sensors regarding any point in the range of both sensors can be fused to describe that point. If the sensors collect different types of data, the point can be described using these different data types. If the sensors collect the same type of data, the two measurements can be combined to increase the accuracy of a given measurement.

In approaches in which depth information from a depth sensor and texture information from a texture sensor are combined, calibration is required to align the two sensors. One class of approaches for calibration relies on extracting depth information from a two-dimensional image or identifying "feature points" in the two-dimensional image using computer vision processing approaches. These feature points, or this set of depth information, is then used to solve for a transform between the perspective of the texture sensor to the perspective of the depth sensor. However, these approaches are limiting in that they are constrained by the accuracy of the computer vision processing algorithms and the existence of common feature points in both sets of data. Given that both sets of data can be captured using modalities that greatly differ, finding common feature points may be difficult. Furthermore, the accuracy of harvesting depth information from texture maps using computer vision processing algorithms is currently insufficient—hence the need for depth sensors in the first place. Additionally, although the obstacle of not having strong enough feature points can be overcome by using physical calibration targets like fiducial tags or markers (e.g., an AprilTag or ArUco marker), it is nearly always better to provide a calibration system that functions in any environment and without the need for external targets.

In specific embodiments of the invention, a combined depth and texture sensor system is provided in which a depth sensor and texture sensor are not co-located. The depth sensor can be positioned to have a first perspective and the texture sensor can be positioned to have a second perspective. The first and second perspectives can be misaligned by more than 20 degrees in one or more of yaw, pitch, and roll, but are partially overlapping. As used herein, the term "perspective" refers to a volume defined by a right cone with a slant set by the angle of view of a sensor associated with that perspective. The location of the perspective can be defined with respect to a top point of that cone and a pose (yaw, pitch, roll) of the center line of the cone. Partially overlapping perspectives are those in which the volumes of the two cones that define those perspectives intersect. Using specific embodiments of the approaches disclosed herein, the information from the depth sensor can be used to provide depth information, in real time, to one or more texture maps captured by one or more texture sensors; and/or the information from the texture sensor can be used to provide texture information, in real time, to color one or more streams of three-dimensional point clouds from one or more depth sensors. The one or more depth sensors can be LIDARs. The one or more texture sensors can be visible light cameras.

In specific embodiments of the invention, a sensing system is calibrated using a calibration system. The sensing system can include a sensing system depth sensor and a texture sensor. The sensing system depth sensor can be positioned to have a first perspective and the texture sensor can be positioned to have a second perspective. The calibration system can include a calibration depth sensor positioned to have the second perspective. The calibration depth sensor may be the same or different from the sensing system depth sensor. Regardless, the fact that a depth sensor has been positioned at both the first and second perspectives allows for the mutual registration of the texture sensor and the sensing system depth sensor using a reference map. The reference map can include a transform from a reference frame based on the first perspective and a reference frame based on the second perspective. The reference map can be used, as will be described below, to fuse information captured by a depth sensor positioned to have the first perspective with information captured by a texture sensor positioned to have the second perspective. After calibration, the calibration depth sensor can be removed from the system, or it can be used as the sensing system depth sensor. Regardless, these embodiments allow for a reduced cost of the system as there is no need for a depth sensor at both the first and second perspectives during regular operation. Furthermore, this allows a single depth sensor to be provided to an end user to allow them to calibrate the system without the need for a separate calibration depth sensor.

In specific embodiments of the invention, the reference map can be generated using depth information collected from the first perspective and the second perspective. Since the reference map is generated using two sets of data from the same capture regime (i.e., two depth captures) the accuracy is higher than can be generated between two sets of data using different capture regimes (i.e., a texture capture and a depth capture) and there is less need for the use of external fiducials that can provide strong feature points in both a depth and texture capture regime.

In specific embodiments of the invention, the reference map is used in combination with the readings taken by the calibration depth sensor from the second perspective in order to register the texture sensor with the sensing system by locating the second perspective in a common reference frame which is shared by the sensing system depth sensor. Readings taken by the sensing system depth sensor itself from the first perspective can likewise be used with the reference map to locate the first perspective in the common reference frame. These embodiments can be executed regardless of whether the reference frame is originally generated using readings taken by the sensing system depth sensor and the calibration depth sensor, or if the reference map is available ex ante to the acquisition of readings from the calibration and/or sensing system depth sensors.

In specific embodiments of the invention, a method is provided. The method includes transmitting a first light beam from a first perspective, transmitting a second light beam from a second perspective, aligning a visible light photodetector with the second perspective, aligning a depth sensor with the first perspective, and mutually registering the visible light photodetector and the depth sensor using a return of the first light beam, a return of the second light beam, and a reference map. The reference map can include a transform from a reference frame based on the first perspective and a reference frame based on the second perspective.

In specific embodiments, a calibrating system for calibrating a sensing system is disclosed. The system includes a depth sensor mounted using a first mount and located at a first perspective, and a visible light photodetector mounted using a second mount and located at a second perspective. The system transmits a first light beam from the first perspective and a second light beam from the second perspective. The system also includes a registration engine programmed to mutually register the visible light photodetector and the depth sensor using a reference map, a return of the first light beam, and a return of the second light beam.

DETAILED DESCRIPTION

Sensor systems, and associated calibration systems and methods, that provide efficient and reliable depth and texture fusion in accordance with the summary above are disclosed below. In specific embodiments of the invention, the sensing system includes a depth sensor, such as a LIDAR, and a texture sensor, such as a visible light photodetector, which are not co-located. However, information from both sensors can be fused using a reference map. The fusion of information can utilize depth sensor information obtained from a first perspective associated with the sensing system depth sensor and a second perspective associated with the texture sensor. This fusion of information can be conducted by mutually registering the sensing system depth sensor and the visible light sensor to a common reference frame using the reference map and the depth sensor information. In specific embodiments of the invention, the reference map can also be generated using the depth sensor information.

Figure 1:
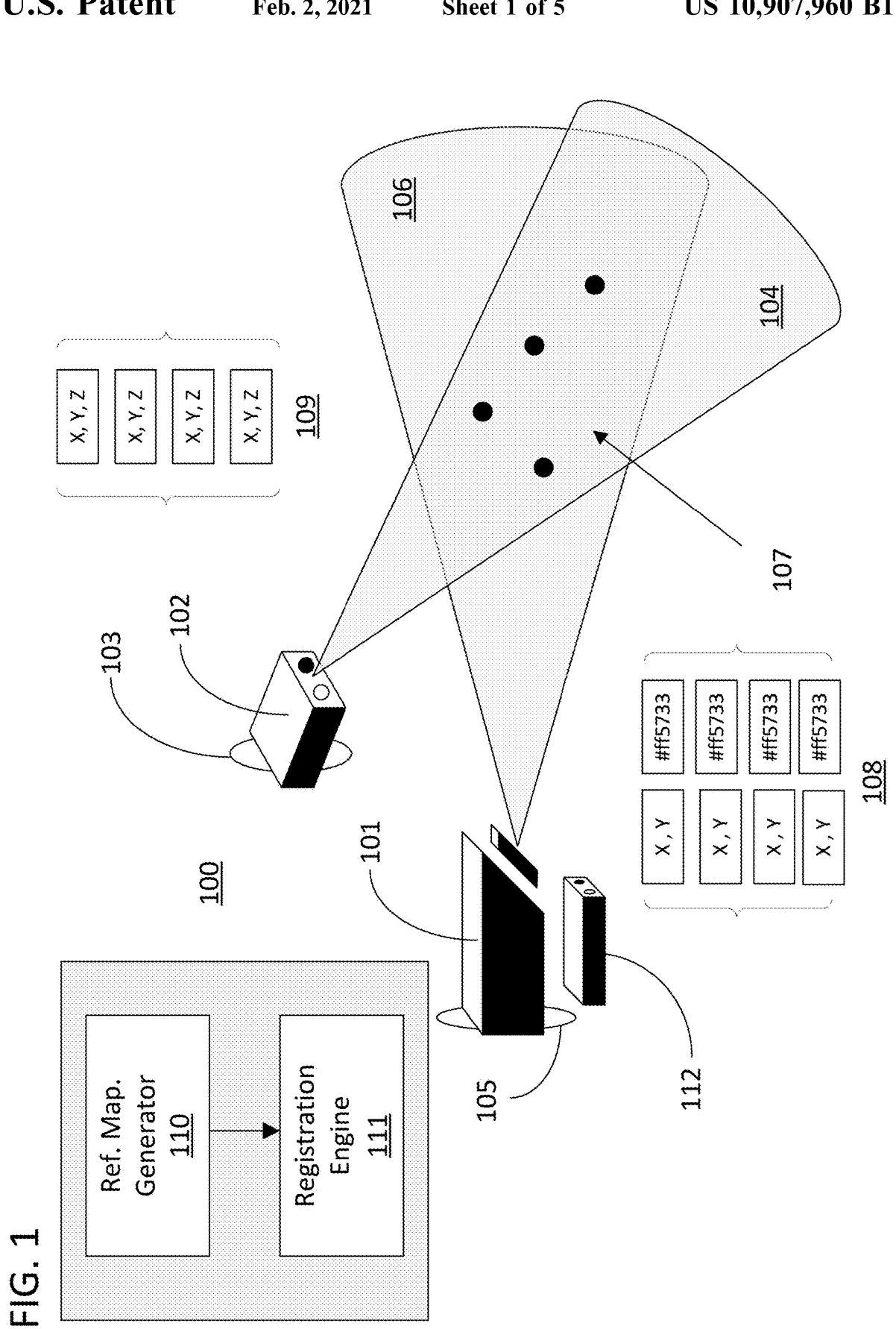
FIG. 1 illustrates a block diagram showing the operation of a sensing system in accordance with specific embodiments of the invention disclosed herein.

FIG. 1 illustrates a block diagram showing the operation of a sensing system 100 in accordance with specific embodiments of the invention disclosed herein. Sensing system 100 includes a texture sensor in the form of a visible light photodetector on camera 101 and a depth sensor in the form of a LIDAR 102. The area within range of the sensing system can be referred to as a scene. The scene can include moving objects that pass through the scope of the scene and then exit. In specific embodiments, the sensing system will itself be mobile such that objects can pass through the scope of the scene although they are not themselves in motion. Camera 101 can be a standard two-dimensional camera or a three-dimensional camera. Camera 101 can detect visible light but can also include the ability to project and detect infrared light to illuminate a set of points for detection in low light environments. Sensing system 100 can be a multispectral LIDAR system. LIDAR 102 can be a multispectral LIDAR photodetector capturing not only a distance value, but also spectral response information for points that are within range of the sensor. LIDAR 102 can use a ToF measurement or a change-in-frequency (CiF) measurement using a frequency-modulated continuous wave (FMCW) LIDAR imaging system to obtain information regarding the three-dimensional location of points in the scene.

The sensors of sensing system 100 are not co-located and view the scene from different perspectives. LIDAR 102 is mounted using a first mount 103 and is located at a first perspective 104. Camera 101 is mounted using a second mount 105 and is located at a second perspective 106. First perspective 104 and second perspective 106 are misaligned by over 20 degrees of one of: pitch, yaw, and roll; and are partially overlapping. The overlapping portion of the two perspectives includes a set of points 107 which are within range of both sensors. As illustrated, camera 101 provides a set of texture data 108 for set of points 107 in the form of two dimensional pixel locations and hex-coded color data; while LIDAR 102 provides a set of depth data 109 for set of points 107 in the form of three-dimensional point locations. However, as described in the summary above, since the sensors detect the scene from different perspectives, without some form of calibration, there is no way to fuse these two data sets into a holistic description of set of points 107.

Although sensing system 100 includes two sensors, in specific embodiments of the invention, the number of sensors in the sensing system can exceed two and can include a widely varying mixture of different sensing modalities. In these embodiments, the perspectives of the various sensors do not need to all overlap, but a perspective of each sensor, and particularly the sensing range of the sensors from that perspective, should overlap with the sensing range of at least one other sensor in the sensing system.

Additional elements in FIG. 1 can be used to conduct the calibration required to fuse the data collected by camera 101 and LIDAR 102. Sensing system 100 additionally includes a registration engine 111 programmed to mutually register the visible light photodetector of camera 101 with the depth sensor in LIDAR 102. The operation of registration engine 111 can include usage of a reference map, a return of a first light beam transmitted from the first perspective and a return of a second light beam transmitted from the second perspective. Sensing system 100 also includes a reference map generator 110 which can be used to generate the reference map used by registration engine 111. Reference map generator 110 is an optional component of the system as, in specific embodiments of the invention, the reference map can be available to the system ex ante, prior to the execution of any of the calibration steps described herein. For example, the reference map can be generated from a prior scan of a scene using data from an alternative mapping system. Sensing system 100 also includes a calibration depth sensor 112 which can be used to transmit one or both of the first and second light beams used by registration engine 111. Calibration depth sensor 112 is an optional component of the system as, in specific embodiments of the invention, depth sensor 102 is used as the sensing system depth sensor and the calibration depth sensor 112.

Registration engine 111 can be instantiated on a processor, microcontroller, application specific integrated circuit (ASIC), and the like, and can be used to mutually register the sensors in the sensing system. The registration engine 111 can include a return analyzer for studying a return of the light beams mentioned in the previous paragraph such as those found in standard ToF or FMCW LIDAR systems. The registration engine 111 can be a network accessible element with the ability to receive information from a sensor that has received the return of a light beam from the first perspective and the second perspective. The registration engine 111 can be located on one of the devices in the sensing system, a dedicated calibration system, a local server, or a cloud architecture. The registration engine 111 can be located on a single component of the system, or can be distributed across multiple components of the system (e.g., return analyzers located on the same devices that received returns from the two perspectives and a central computation system in a cloud architecture for mutually registering the sensors). The operation of registration engine 111 is described in more detail below.

Reference map generator 110 can be instantiated on a processor, microcontroller, application specific integrated circuit (ASIC), and the like, and can be used to generate a reference map as used by registration engine 111. The reference map generator 110 can include a return analyzer for studying a return of light beams projected onto a scene. The return analyzers can be the same mentioned above with reference to registration engine 111. Reference map generator 110 can be instantiated on the same hardware as registration engine 111 or on different hardware. The reference map generator 110 can be a network accessible element with the ability to receive information from a sensor that has received the return of a light beam from the first perspective and the second perspective. The reference map generator 110 can be located on one of the devices in the sensing system, a dedicated calibration system, a local server, or a cloud architecture. The reference map generator 110 can be located on a single component of the system, and can be distributed across multiple components of the system (e.g., return analyzers located on the same device or devices that project sounding signals onto a scene and a central computation system in a cloud architecture for generating a reference map from sounding signals). The reference map can take on various forms and can be a three-dimensional description of a scene that is within the range of the sensors of the sensing system or it can more specifically be a mathematical translation from the perspective of one or more sensors in a sensing system into the other perspectives of another sensor in the sensing system. The operation of reference map generator 110 is described in more detail below.

Figure 2:
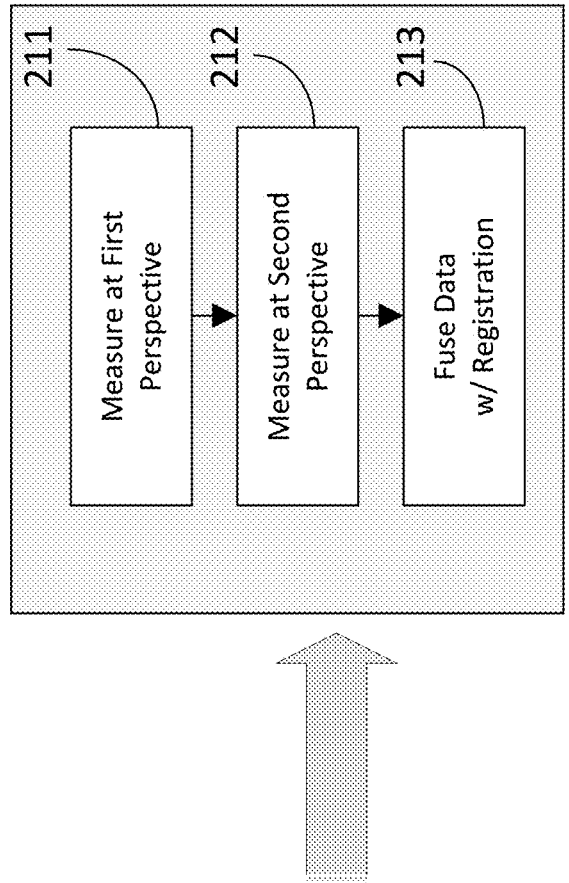
FIG. 2 illustrates a flow chart for a set of methods for calibrating a sensing system and a flow chart for a set of methods for operating the sensing system in accordance with specific embodiments of the invention disclosed herein.
Figure 2:
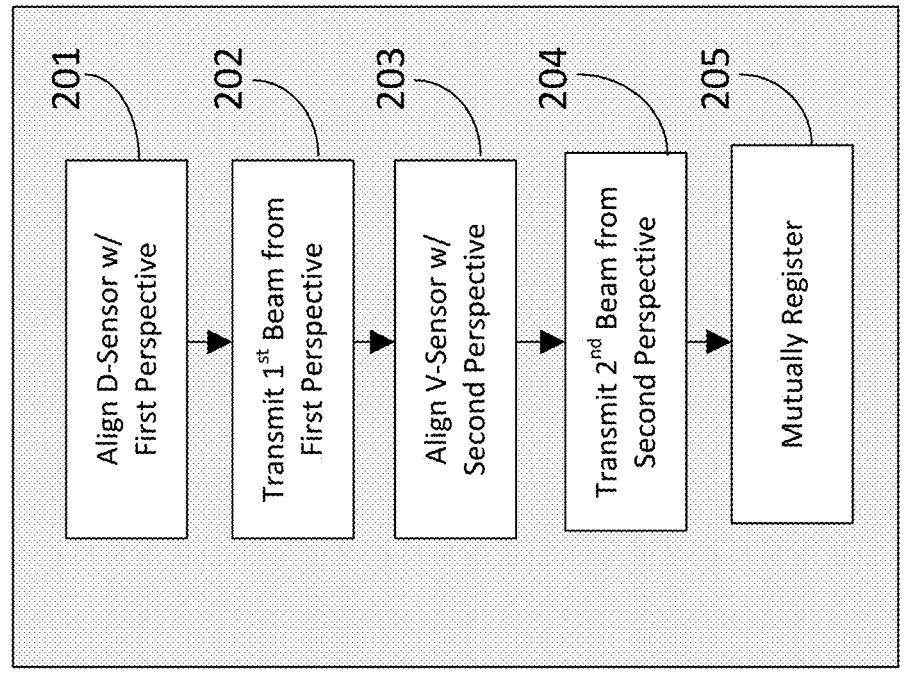

FIG. 2 illustrates a flow chart 200 for a set of methods for calibrating a sensing system and a flow chart 210 for a set of methods for operating the sensing system in accordance with specific embodiments of the invention disclosed herein. In specific embodiments of the invention, flow chart 200 and flow chart 210 can each be executed without the need for external calibration targets such as fiducial markers or other encodings whether spatial, temporal, or otherwise. Calibration flow chart 200 generally involves obtaining depth information from two different perspectives and mutually registering two sensors located at those two different perspectives using a reference map. However, there are numerous variations in terms of how the depth information is obtained, how the reference map is obtained, and how the mutual registration is conducted. Furthermore, as mentioned above there can be far more than two sensors in the system such that specific steps of flow chart 200 may need to be repeated to mutually register the other sensors in the system if they are located at additional (e.g., third and fourth) perspectives. The operation of flow chart 210 generally involves utilizing the mutual registration obtained using the calibration flow chart 200 to fuse sensor data collected from two different sensors—one located at the first perspective and one located at the second perspective. However, depending upon how many sensors have been registered, sensor fusion in the execution of flow chart 210 can include fusing data from many sensors.

Flow chart 200 includes several steps shown in order. However, as will be apparent from a review of the description below regarding specific embodiments of the invention, the steps can be conducted in various chronological orders. Flow chart 200 begins with a step 201 of aligning a depth sensor with a first perspective. The first perspective can be perspective 104 from FIG. 1 and the depth sensor can be LIDAR 102. The depth sensor can be aligned with the perspective by being placed in a mount or fixed anchor point. The mount could be mount 103. The first perspective can be the anticipated perspective of the depth sensor in the operational state of the system such as the one used in the execution of step 211. Flow chart 200 continues with a step 202 of transmitting a first light beam from the first perspective. The step can be conducted by the depth sensor which was aligned with the first perspective in step 201. The light beam can be one of many sounding signals transmitted from the depth sensor to conduct a measurement. The light beam could by a single wavelength beam used for ToF analysis or a variant wavelength beam used for frequency analysis.

Flow chart 200 continues with a step 203 of aligning a visible light photodetector with a second perspective. The second perspective can be perspective 106 from FIG. 1 and the visible light photodetector can be camera 101. In specific embodiments of the invention, the visible light photodetector can be replaced with any texture sensor. The visible light photodetector can be aligned with the second perspective by being placed in a mount or fixed anchor point. The mount could be mount 105. Flow chart 200 continues with a step 204 of transmitting a second light beam from the second perspective. The second perspective can be perspective 106. The light beam can be transmitted by a calibration depth sensor or the sensing system depth sensor. The light beam can be one of many sounding signals transmitted from the depth sensor to conduct a measurement. The light beam could be a single wavelength beam used for ToF analysis or a variant wavelength beam used for frequency analysis. The depth sensor could be a calibration depth sensor 112 or the sensing system depth sensor 102. Step 204 can be conducted prior to the execution of step 203 by placing a depth sensor in the same mount or fixed anchor point as is used to set the perspective of the visible light sensor in step 203. Alternatively, the steps can be conducted in the order shown with the depth sensor being placed at the same perspective as the visible light camera was placed in step 203 to the extent the depth sensor is placed close enough that minor parallax errors can be corrected for to obtain a distance from the aperture of the visible light camera in response to the sounding signals sent out from the depth sensor in step 204.

Flow chart 200 continues with a step 205 of mutually registering the visible light photodetector and the depth sensor using a return of the first light beam, a return of the second light beam, and a reference map. The reference map is assumed to be available ex ante to the execution of flow chart 200. However, in specific embodiments of the invention, the reference map will be generated using sounding signals transmitted along with the light beams transmitted in steps 202 and 204. The mutual registration of the visible light detector and the depth sensor allows for fusion of the sensor data acquired by those devices. For example, and as shown in flow chart 210, a scene can be measured using a depth sensor located at the first perspective in a step 211, the same scene can be measured using a visible light photodetector located as the second perspective in a step 212, and the data from both sensors can be fused using the mutual registration from step 205 in a step 213.

Calibration flow chart 200 and operation flow chart 210 can be expanded for systems with additional sensors by adding the alignment of the same or additional depth sensors from additional perspectives (e.g., third and fourth), transmitting light beams from those additional perspectives, and mutually registering the additional sensors using the reference map and returns of the additional light beams. The additional sensors can be any depth or texture sensors including visible light cameras, LIDAR, and other sensors. For example, flow chart 200 could be expanded to include a step of transmitting a third light beam from a third perspective, aligning an additional sensor with the third perspective (e.g., a depth sensor), and mutually registering the visible light sensor, depth sensor, and the additional sensor using the reference map and a return of the third light beam.

In specific embodiments of the invention, multiple sensors in a sensing system will be mutually registered using a reference map. The reference map can be a three-dimensional model of a scene including a set of three or more feature points. In specific embodiments, the reference map can include four or more feature points to allow for the unambiguous solution of a perspective of an observer with respect to those points. The feature points can be detected and distinguished by a depth sensor observing the scene. As a result, an observation of those feature points using a depth sensor will allow for the localization of the depth sensor with respect to that scene. If two observations of the feature points are taken by one or more depth sensors from one or more perspectives the localization of the depth sensors with respect to the scene will allow for the mutual registration of sensors located at those perspectives.

In specific embodiments of the invention, the reference map can alternatively include a geometric rotation and translation between a first perspective and a second perspective. The reference map can also be a geometric rotation and translation between a first point cloud captured from the first perspective and a second point cloud captured from the second perspective. In specific embodiments of the invention, the reference map can alternatively include a geometric rotation and translation between the first perspective or a first point cloud captured from the first perspective, and a reference coordinate system; along with a geometric rotation and translation between a first perspective or a second point cloud and a reference coordinate system. The reference coordinate system can be a shared cartesian coordinate system defined with respect to a scene that is observed by the sensors in the system. Reference maps that include geometric rotations and translations to the shared reference coordinate system can be useful when multiple sensors are being mutually registered, as opposed to a set of two sensors.

In specific embodiments of the invention, the depth data used to mutually register the one or more sensors of the sensing system can be collected in various ways. In specific embodiments of the invention, a depth sensor is positioned next to a visible light camera. The depth sensor is used to generate depth data in the form of a reference frame. The same depth sensor can then be moved to a new position and capture a new reference frame from the new position. The two reference frames can then be used to generate a reference map which can be used to register the visible light camera and the depth sensor as placed in the new position. In alternative embodiments, a separate depth sensor is used to generate depth data from the position of the visible light camera and/or the new position. That separate depth sensor can be a calibration depth sensor, such as calibration depth sensor 112 from FIG. 1, which is subsequently removed from the system after the mutual registration has been completed.

Figure 3:
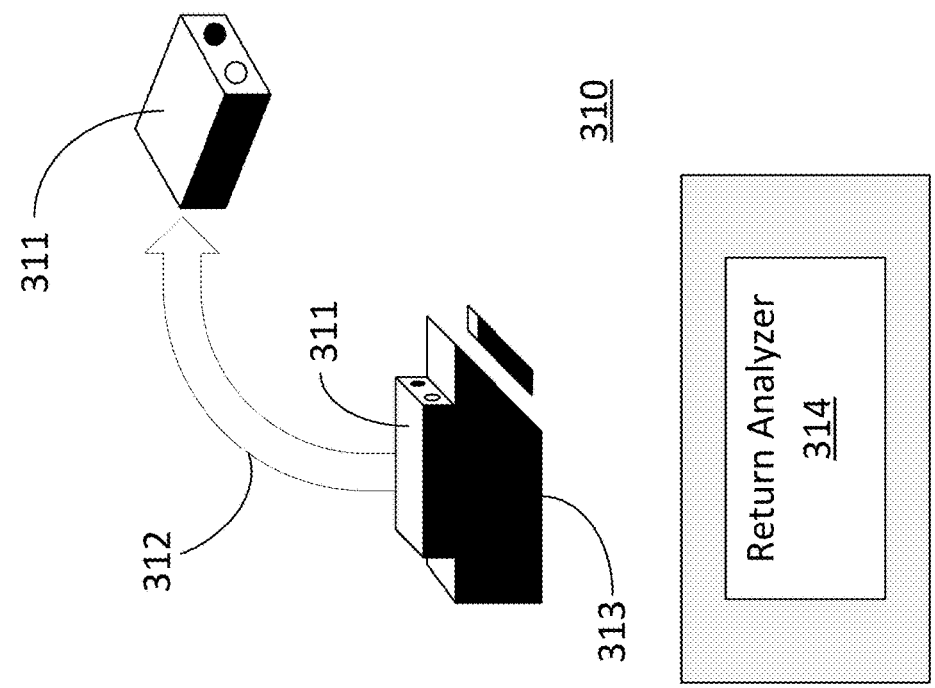
FIG. 3 illustrates a block diagram and flow chart for a set of methods for calibrating a sensing system using a single piece of hardware for a calibration depth sensor and a sensing system depth sensor in accordance with specific embodiments of the invention disclosed herein.
Figure 3:
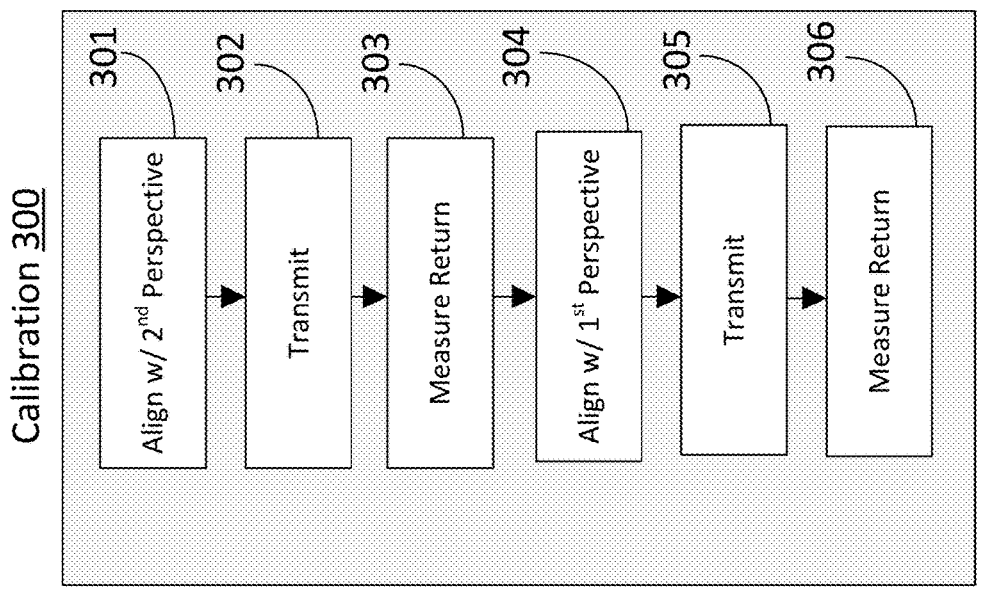

FIG. 3 illustrates a block diagram 310 and flow chart 300 for a set of methods for calibrating a sensing system using a single piece of hardware for a calibration depth sensor and a sensing system depth sensor in accordance with specific embodiments of the invention disclosed herein. The calibration depth sensor and sensing system depth sensor are both provided by depth sensor 311 which is moved 312 after capturing the required depth data from the perspective that is aligned with visible light camera 313.

Flow chart 300 includes the step 301 of aligning the depth sensor 311 with the second perspective (the perspective of visible light camera 313), a step 302 of transmitting a light beam from the second perspective, and a step 303 of measuring the return of the second light beam, using a LIDAR photodetector, from the second perspective. Depth sensor 311 can include the ability to both transmit the light beam and include a LIDAR photodetector for measuring the return. In alternative embodiments of the invention, in which different depth sensors are used to transmit a beam from the first perspective and the second perspective, the return can be measured by a second LIDAR photodetector located on the calibration depth sensor. Flow chart 300 continues with a step 304 of aligning the depth sensor with the first perspective (which can involve movement 312), a step 305 of transmitting a second light beam from the first perspective, and a step 306 of measuring a return of the second light beam using a LIDAR photodetector in depth sensor 311 from the second perspective.

In specific embodiment of the invention, the depth sensor can include a return analyzer programmed to generate a point cloud based on the return of light beams transmitted by the depth sensor. The point clouds can then be used to solve for a reference map. The return analyzer can be a standard return analyzer used in ToF or FMCW LIDAR systems. The point cloud can describe a set of three or more points in three-dimensional space relative to a frame of the return analyzer. For example, return analyzer 314 can be a component of depth sensor 311 and generate a first point cloud based on the return of light beams transmitted in step 302. The return analyzer 314 can then be moved as in step 304 and then generate a second point cloud based on the return of light beams transmitted in step 305. As the depth sensor has been moved before measuring the two sets of returns, the frame of the return analyzer will be different with respect to the reference frame of the scene before and after step 304 is executed. Accordingly, solving for a reference map from the first point cloud to the second point cloud will provide a reference map between the first perspective to the second perspective. The reference map generator 110 can generate such a reference map using the first and second point clouds as provided by the return analyzer 314. The process can include determining a common feature set between the first and second perspective using an edge detection analysis conducted on the point clouds and conducting a simultaneous localization and mapping (SLAM) analysis on the common feature set to solve for the pose of the sensor for each perspective. This process can be conducted without the LIDAR system needing a calibration target as the depth variations of scenes in typical real world environments like a street or the outside of a secured home or facility are likely to provide sufficiently distinct volumetric structures for such a common feature set.

Figure 4:
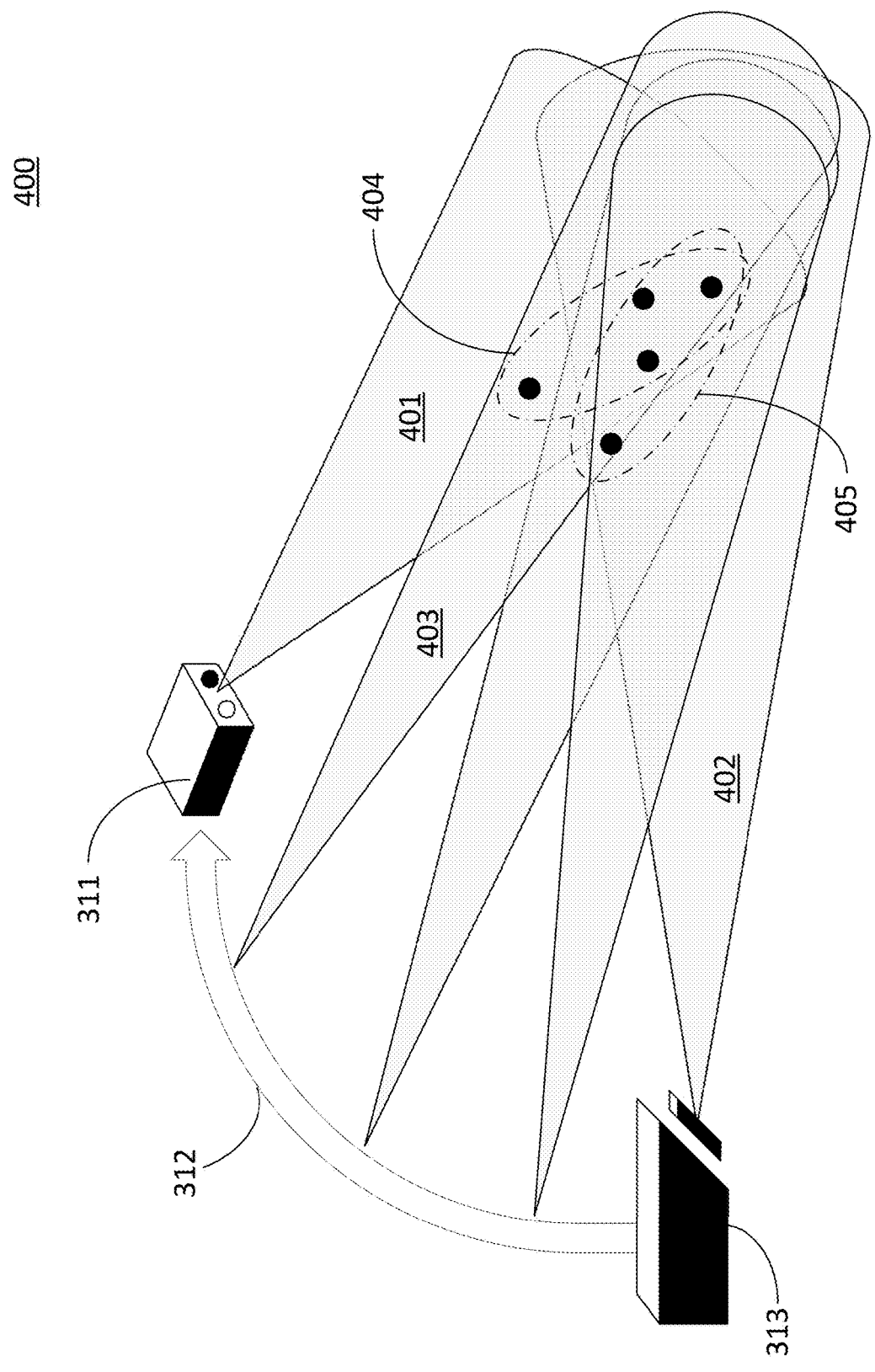
FIG. 4 illustrates a block diagram of a method for generating a reference map in accordance with specific embodiments of the invention disclosed herein.

FIG. 4 illustrates a block diagram 400 of a method for generating a reference map in accordance with specific embodiments of the invention disclosed herein. FIG. 4 includes depth sensor 311 and visible light camera 313 from FIG. 3 along with the illustration of how depth sensor 311 is moved 312. However, in the case of FIG. 4, the first perspective 401 and the second perspective 402 do not have sufficient overlap in order to generate a mapping from one perspective to the other. As shown, perspectives 401 and 402 only share three common feature points. However, perspectives 401 and 402 both independently share four feature points with perspective 403 (sets 404 and 405). Accordingly, generation of the reference map can include additional captures by the depth sensor as it moves away from the visible light camera towards its destination. The overall reference map can then be generated based on a set of returns that are generated based on a set of light beams from a set of perspectives where the set of perspectives are perspectives along a path, such as movement path 312, from the first perspective to the second perspective. The process scan includes a return analyzer of depth sensor 311 generating a set of point clouds (such as a third point cloud) and generating the reference map using the set of point clouds.

In specific embodiments of the invention, the depth sensor can capture the reference map in various ways. As in FIG. 3, the depth sensor can be the same depth sensor that will be used in the operational phase of the system. For example, the depth sensor could be a LIDAR, and the LIDAR can conduct various types of different captures as it moves along path 312. For example, the LIDAR can be beam steered with all of the frames being kept through the movement of the LIDAR to allow for the building of a map and for positioning the LIDAR within the map (e.g., by using SLAM techniques as the sensor is moved). In alternative embodiments, the depth sensor used to capture the reference map can be a dedicated mapping tool such as a full 360-degree three-dimensional environmental mapping laser scanner. The scanner could then be placed on a tripod in the center of the scene and used to conduct a full scan of the environment to be used as the reference map. The scanner could be moved to several different positions within the scene to assure that any occluded region of the scene was also captured, and the multiple captures could be stitched together to form the reference map. In alternative embodiments of the invention, the depth sensor used to capture the reference map could be a mobile mapping solution (MMS) such as in a wearable backpack or helmet form factor that could generate the reference map as the capture device is moved from the first perspective to the second perspective. Any of these approaches can involve transmitting a set of light beams from a set of perspectives, where the set of perspectives are perspectives along a path from the first perspective to the second perspective, and generating the reference map based on a set of returns of the light beams. The process can also include generating a set of point clouds based on the set of returns of the light beams and generating the reference map using the set of point clouds.

Sensing systems that have been calibrated using the approaches disclosed herein can be utilized in numerous applications. The data from all the sensors, and the reference map data can all be used for various forms of sensor fusion. For example, in approaches in which the reference map includes a full three dimensional model of the scene, the three-dimensional information can comprise "live" three-dimensional information coming from the LIDAR in the sensing system as augmented by static three-dimensional information coming from the referefence map that was generated during the calibration. Furhtermore, the sensor data collected from the visible light sensor can be applied to the three-dimensional data obtained by the depth sensor. For example, a camera can produce two-dimensional color data which can be used to provide color, and other texture data, inside a three-dimensional model generated by a LIDAR from an alternative perspective. Furthermore, the sensor data collected from the depth sensor can be applied to the sensor data collected from the visible light sensor. In specific embodiments of the invention, depth information gathered by a depth sensor could be injected into the two-dimensional camera data to add depth and three-dimensional effects to the camera data, or to change the camera data to 2.5 D data.

In specific embodiments of the invention, a method is provided of using a LIDAR system that has been calibrated using the methods disclosed herein to augment a three-dimensional point cloud captured by a LIDAR system with texture data such as color from a visible light camera. The method includes capturing a frame with the visible light photodetector from the perspective, generating a texture map using the frame, transmitting a light beam from another perspective, based on a return of the light beam, generating a point cloud, and adding texture data to the point cloud using the texture map. The point cloud can be referred to as a third point cloud in this example to distinguish a point cloud generated during the operational phase of the system from the at least two point clouds mentioned above which were generated during a calibration phase.

In specific embodiments of the invention, a method is provided of using a LIDAR system that has been calibrated using the methods disclosed herein to derive depth data from a set of two-dimensional data from a visible light camera and inject that data into a three-dimensional model. The method includes capturing a frame with a visible light photodetector from a perspective, deriving depth information from the frame, transmitting a light beam from a different perspective, based on a return of the light beam, generating a point cloud, and adding a set of additional points to the point cloud using the derived depth information. The derived depth information can be harvested from a two-dimensional camera to be used to augment the three-dimensional data captured by a LIDAR from an alternative perspective. For example, if portions of a scene captured by the LIDAR are occluded from the perspective of the LIDAR, machine intelligence techniques could be applied to harvest depth data from the two-dimensional visible light data, as to those portions of the scene that were occluded from the perspective of the LIDAR, to add to the overall depth information generated by the sensing system. The two-dimensional data could also be used with classifiers to identify items in the scene and estimate their three-dimensional expected profiles based on those classifications to extend the scarce three-dimensional data from the LIDAR. Since the three-dimensional data and two-dimensional data share the same three-dimensional reference map and the position and pose of each sensor is known to the other, two-dimensional images or conclusions based on those images can be projected into the common three-dimensional space.

In specific embodiments of the invention, more than one depth sensor can be inlcuded in the sensing system and the same techniques can be used to mutually regiser, or otherwise determine the pose and position of each depth sensor using the same techniques described. As a result, the size of zones covered by a depth sensor can be increased by having more than one depth sensor.

Figure 5:
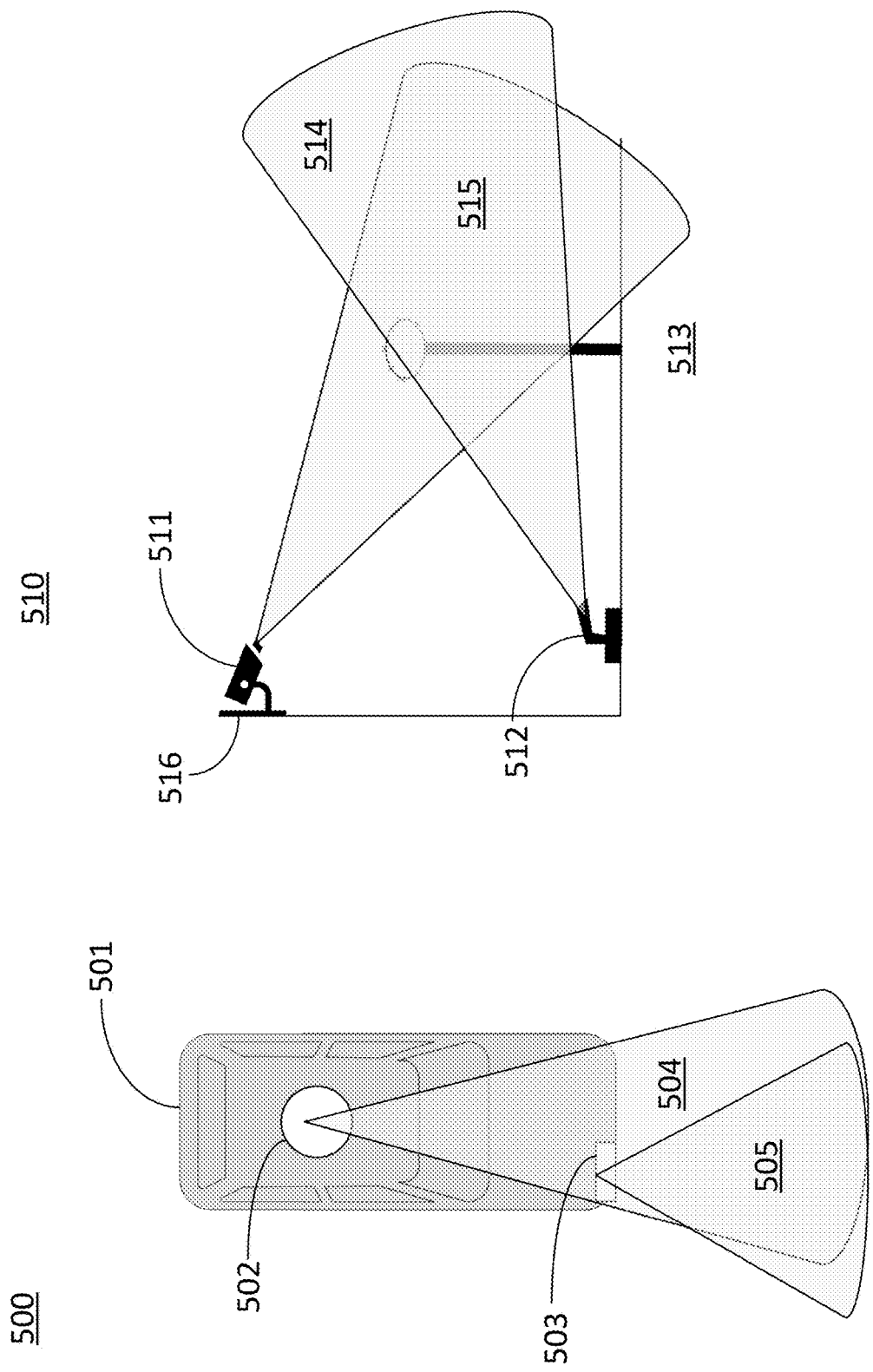
FIG. 5 illustrates two block diagrams of two applications of a sensing system calibrated in accordance with specific embodiments of the invention disclosed herein.

FIG. 5 illustrates two block diagrams 500 and 510 of two applications of a sensing system calibrated in accordance with specific embodiments of the invention disclosed herein. Block diagram 500 includes a vehicle 501 where a multi-spectral LIDAR system that has been calibrated in accordance with approaches disclosed herein is a sensing system for the vehicle. The vehicle includes a first fixed anchor point 502 where the first perspective 504 is a potential perspective of a depth sensor in the form of a LIDAR mounted on first fixed anchor point 502. The vehicle also includes a second fixed anchor point 503 where the second perspective 505 is a perspective of a texture sensor in the form of a visible light camera. The second anchor point 503 is a mount for a visible light photodetector. The first anchor point is a mount for a LIDAR photodetector. The approaches disclosed herein can be used to mutually register the LIDAR photodetector and the visible light photodetector on vehicle 501. In particular, the LIDAR photodetector, or a calibration depth sensor, could first be placed on the second anchor point 503 and obtain a measurement for generating a point cloud. The point cloud could then be used, along with another point cloud generated from measurements taken while the LIDAR photodetector was at first anchor point 502, to generate a reference map to mutually register the camera and LIDAR.

Block diagram 510 is of a surveillance system that has been calibrated using specific embodiments of the invention disclosed herein. Block diagram 510 includes a visible light photodetector in the form of a wall mounted camera 511 which is mounted at a perspective 515. Block diagram 510 also includes a depth sensor in the form of a LIDAR photodetector 512 located at another perspective 514. The surveillance system is being used to monitor zone of interest 513. A mount 516 for camera 511 aligns camera with perspective 515. Depth sensor 512 and camera 511 can be mutually registered using the approaches disclosed herein such that sensor fusion is possible for the overlapping portions of the perspectives. Depth sensor 512 can be an augmentation for an existing surveillance system and be designed to connect to mount 516 or camera 511 so that it can have perspective 515 for purposes of taking calibration measurements. However, depth sensor 512 can have the same features and be provided in a package with camera 511. Features of specific embodiments of the invention provide certain benefits when depth sensor 512 is an augmentation to an existing system because of the lack of a co-location requirement for mutually registering the sensors. In specific implementations, it may be impractical to install depth sensor 512 to have perspective 515 because of limited space consumed by camera 511. Also, depth sensor 512 can be positioned to be shared by multiple visible light photodetectors that are mutually registered to decrease the number of sensors required for the sensing system overall. The color data collected by those multiple photodetectors could be used to color the three-dimensional data, and the depth sensor data could be provided to augment the two-dimensional data of the multiple photodetectors. Also, when adding depth sensing to an existing system, an end user might only need to add that capability to certain zones which might not overlap with the optimal positioning of the visible light cameras such that separate positioning adds additional benefits.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure where generally directed to LIDAR, any sensing system with a depth sensor could benefit from specific embodiments of the invention disclosed herein. Although the specific example of a vehicle traveling on a road was mentioned, the same approaches could be utilized by ships traveling on water, off-road vehicles traveling on wild terrain, or submarine vehicles navigating underwater. These and other modifications and variations to the present invention may be practiced by those skilled in the art, without departing from the scope of the present invention, which is more particularly set forth in the appended claims.

What is claimed is:

1. A calibration method for calibrating a sensing system, comprising the steps of:
   aligning a depth sensor, mounted using a first mount, so that the depth sensor has a first perspective;
   aligning a visible light photodetector, mounted using a second mount, so that the visible light photodetector has a second perspective;
   transmitting a first light beam from the first perspective;
   transmitting a second light beam from the second perspective;
   generating, using a return analyzer, a first point cloud based on a return of the first light beam;
   generating, using the return analyzer, a second point cloud based on a return of the second light beam;
   generating, using a reference map generator, a reference map using the first and second point clouds and a third point cloud; and
   mutually registering, using a registration engine, the visible light photodetector and the depth sensor using the reference map;
   wherein the depth sensor is a first lidar photodetector; and
   wherein the third point cloud is generated based on a return received by a second lidar photodetector.

2. The calibration method of claim 1, further comprising:
   measuring the return of the first light beam, using flail the first lidar photodetector, from the first perspective; and
   measuring the return of the second light beam, using the first lidar photodetector, from the second perspective.

3. The calibration method of claim 1, further comprising:
   measuring the return of the first light beam, using the first lidar photodetector, from the first perspective; and
   measuring the return of the second light beam, using the second lidar photodetector, from the second perspective.

4. The method of claim 1, wherein:
   the reference map is a geometric rotation and translation between the first point cloud and the second point cloud.

5. The method of claim 1, wherein the reference map is:
   a geometric rotation and translation between the first point cloud and a reference coordinate system; and
   a geometric rotation and translation between the second point cloud and the reference coordinate system.

6. The method of claim 1, wherein the reference map is:
   a reference coordinate system; and
   at least four feature points in the reference coordinate system.

7. The method of claim 1, further comprising the steps of:
   transmitting a set of light beams from a set of perspectives;
   wherein the set of perspectives are perspectives along a path from the first perspective to the second perspective; and
   wherein the reference map is generated based on a set of returns of the set of light beams.

8. The method of claim 7, further comprising the steps of:
   based on the set of returns of the set of light beams, generating a set of point clouds; and
   generating the reference map using the set of point clouds.

9. The method of claim 1, wherein the first and second perspectives are:
   misaligned by over 20 degrees of one of: pitch, yaw, and roll; and
   partially overlapping.

10. The method of claim 1, further comprising:
    transmitting a third light beam from a third perspective;
    aligning a second depth sensor with the third perspective; and
    mutually registering the visible light photodetector, the depth sensor, and the second depth sensor using the reference map.

11. The method of claim 1, wherein:
    the method for calibrating the sensing system does not use a calibration target; and
    the generating of the reference map is conducted by determining a common feature set between the first perspective and the second perspective.

12. The method of claim 1, wherein:
    the depth sensor is a multispectral lidar photodetector.

13. The method of claim 1, wherein:
    the depth sensor is a sensor for a vehicle;
    the first perspective is a first fixed anchor point perspective, wherein the first fixed anchor point is located on the vehicle;
    the second perspective is a second fixed anchor point perspective, wherein the second fixed anchor point is located on the vehicle;
    the first anchor point is a mount for the visible light photodetector; and
    the second anchor point is a mount for the depth sensor.

14. The method of claim 1, wherein:
    the depth sensor is a sensor for a surveillance system;
    the visible light photodetector is a camera mounted at the second perspective; and
    the first perspective is from a mount for the depth sensor.

15. The method of claim 14, wherein:
    the depth sensor is an augmentation for a surveillance system; and
    the visible light photodetector is mounted at the second perspective prior to the start of the calibration method.

16. A method of using a lidar system that has been calibrated using the method of claim 1, comprising the steps of:
    capturing a frame with the visible light photodetector from the second perspective;
    generating a texture map using the frame;
    transmitting a third light beam from the first perspective;
    based on a return of the third light beam, generating a third point cloud; and
    adding texture data to the third point cloud using the texture map.

17. A method of using a lidar system that has been calibrated using the method of claim 1, comprising the steps of:
    capturing a frame with the visible light photodetector from the second perspective;
    deriving depth information from the frame;

transmitting a third light beam from the first perspective;
based on a return of the third light beam, generating a third point cloud; and
adding a set of additional points to the third point cloud using the derived depth information.

18. A calibrating system for calibrating a sensing system, comprising:
a depth sensor mounted using a first mount and having a first perspective;
a visible light photodetector mounted using a second mount and having a second perspective, wherein the calibrating system transmits a first light beam from the first perspective and a second light beam from the second perspective;
a return analyzer programmed to generate a first point cloud based on a return of the first light beam, and to generate a second point cloud based on a return of the second light beam;
a reference map generator programmed to generate a reference map using the first and second point clouds and a third point cloud;
a registration engine programmed to mutually register the visible light photodetector and the depth sensor using the reference map;
a first lidar photodetector; and
a second lidar photodetector;
wherein the first lidar photodetector is the depth sensor; and
wherein the third point cloud is generated based on a return received by the second lidar photodetector.

19. The system of claim 18, wherein the reference map generator is further programmed to:
generate the reference map based on a set of returns of a set of light beams;
wherein the set of returns are generated based on a set of light beams set from a set of perspectives; and
wherein the perspectives are perspectives along a path from the first perspective to the second perspective.

20. The system of claim 18, further comprising:
a vehicle, wherein the sensing system is a system for the vehicle;
a first fixed anchor point on the vehicle, wherein the first perspective is from the first fixed anchor point;
a second fixed anchor point on the vehicle, wherein the second perspective is from the second fixed anchor point;
wherein the first fixed anchor point is a mount for the visible light photodetector; and
wherein the second fixed anchor point is a mount for the first lidar photodetector.

21. The system of claim 18, wherein:
the sensing system is a multispectral lidar system; and
the depth sensor includes a multispectral lidar photodetector.

22. The system of claim 18, wherein:
the sensing system is a surveillance system;
the visible light photodetector is a camera mounted at the second perspective;
the depth sensor includes a lidar photodetector; and
the first perspective is from a mount for the lidar photodetector.

23. The system of claim 18, wherein:
the system is an augmentation for a surveillance system; and
the visible light photodetector is mounted at the second perspective prior to the start of the calibration.

* * * * *

UNITED STATES PATENT AND TRADEMARK OFFICE
CERTIFICATE OF CORRECTION

PATENT NO. : 10,907,960 B1
APPLICATION NO. : 16/735557
DATED : February 2, 2021
INVENTOR(S) : Raul Bravo Orellano Page 1 of 1

It is certified that error appears in the above-identified patent and that said Letters Patent is hereby corrected as shown below:

In the Claims

Column 13, Claim 2, Line 42, after "using", please delete "flail".

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*